(12) United States Patent
Kim et al.

(10) Patent No.: US 11,702,529 B2
(45) Date of Patent: Jul. 18, 2023

(54) PLASTICIZER COMPOSITION AND RESIN COMPOSITION INCLUDING THE SAME

(71) Applicant: LG CHEM, LTD., Seoul (KR)

(72) Inventors: Hyun Kyu Kim, Daejeon (KR); Jeong Ju Moon, Daejeon (KR); Joo Ho Kim, Daejeon (KR); Seok Ho Jeong, Daejeon (KR); Yun Ki Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/640,655

(22) PCT Filed: Oct. 11, 2018

(86) PCT No.: PCT/KR2018/011976
§ 371 (c)(1),
(2) Date: Feb. 20, 2020

(87) PCT Pub. No.: WO2019/074300
PCT Pub. Date: Apr. 18, 2019

(65) Prior Publication Data
US 2020/0354544 A1   Nov. 12, 2020

(30) Foreign Application Priority Data

Oct. 13, 2017  (KR) .................. 10-2017-0133332

(51) Int. Cl.
| | |
|---|---|
| *C08K 5/11* | (2006.01) |
| *C08K 5/12* | (2006.01) |
| *C08K 5/1515* | (2006.01) |
| *C08L 101/00* | (2006.01) |

(52) U.S. Cl.
CPC ............ *C08K 5/11* (2013.01); *C08K 5/12* (2013.01); *C08K 5/1515* (2013.01); *C08L 101/00* (2013.01)

(58) Field of Classification Search
CPC . C08K 5/09; C08K 5/092; C08K 5/10; C08K 5/11; C08K 5/12; C08K 5/0016; C08K 5/1515; C08L 101/00; C08L 2666/68
See application file for complete search history.

(56) References Cited

U.S. PATENT DOCUMENTS

| | | | |
|---|---|---|---|
| 10,626,247 B2 | 4/2020 | Kim et al. | |
| 2007/0037926 A1 | 2/2007 | Olsen et al. | |
| 2007/0287781 A1 | 12/2007 | Grass et al. | |
| 2010/0305255 A1 | 12/2010 | Grass | |
| 2011/0319529 A1 | 12/2011 | Helmer et al. | |
| 2011/0319530 A1 | 12/2011 | Helmer et al. | |
| 2011/0319531 A1 | 12/2011 | Helmer et al. | |
| 2011/0319532 A1 | 12/2011 | Helmer et al. | |
| 2012/0181058 A1 | 7/2012 | Chaudhary et al. | |
| 2013/0137789 A1 | 5/2013 | Olsen et al. | |
| 2013/0303653 A1* | 11/2013 | Donnelly | C08K 5/0016 523/100 |
| 2013/0317152 A1 | 11/2013 | Becker et al. | |
| 2014/0309345 A1 | 10/2014 | Frenkel et al. | |
| 2015/0368431 A1 | 12/2015 | Ghosh-Dastidar et al. | |
| 2016/0009898 A1 | 1/2016 | Woldt et al. | |
| 2017/0081501 A1 | 3/2017 | Kim et al. | |
| 2017/0145187 A1 | 5/2017 | Pfeiffer et al. | |
| 2018/0022893 A1 | 1/2018 | Kim et al. | |
| 2018/0066124 A1* | 3/2018 | Kim | C08K 5/1515 |
| 2018/0072867 A1 | 3/2018 | Kim et al. | |
| 2018/0142078 A1 | 5/2018 | Kim et al. | |
| 2018/0265672 A1 | 9/2018 | Kim et al. | |
| 2018/0319953 A1* | 11/2018 | Kim | C08K 5/10 |

FOREIGN PATENT DOCUMENTS

| | | |
|---|---|---|
| CN | 102504437 A | 6/2012 |
| CN | 106661269 A | 5/2017 |
| CN | 106795325 A | 5/2017 |
| JP | 9-100385 A | 4/1997 |
| JP | 2007-326859 A | 12/2007 |
| JP | 2011-510937 A | 4/2011 |
| JP | 2013-076096 A | 4/2013 |
| JP | 2013-543917 A | 12/2013 |
| JP | 2016-518472 A | 6/2016 |
| KR | 10-2013-0088840 A | 8/2013 |
| KR | 10-2014-0116371 A | 10/2014 |
| KR | 10-2015-0125718 A | 11/2015 |
| KR | 10-2016-0095875 A | 8/2016 |
| KR | 10-2016-0112443 A | 9/2016 |
| KR | 10-2016-0113034 A | 9/2016 |
| KR | 10-2016-0119616 A | 10/2016 |
| KR | 20160130363 A | 11/2016 |
| KR | 10-2017-0012116 A | 2/2017 |
| KR | 10-1770005 B1 | 8/2017 |
| KR | 10-1777143 B1 | 9/2017 |

(Continued)

*Primary Examiner* — Jane L Stanley
(74) *Attorney, Agent, or Firm* — Dentons US LLP

(57) ABSTRACT

A plasticizer composition, and a resin composition including the same. The plasticizer composition includes 70 to 99 wt % of a first plasticizer including a terephthalate-based material and a citrate-based material in a specific weight ratio; and 1 to 30 wt % of a second plasticizer including an epoxidized alkyl ester composition. The plasticizer composition has enhanced physical properties, such as thermal stability and light resistance. In addition, the plasticizer composition has stable and improved tensile and elongation properties, migration resistance and volatile loss.

8 Claims, No Drawings

(56) References Cited

FOREIGN PATENT DOCUMENTS

| TW | 201700568 A | 1/2017 | | |
|----|----|----|----|----|
| WO | WO 2016/129876 A1 | * | 8/2016 | .............. C08K 5/12 |
| WO | WO 2017/018740 A1 | * | 2/2017 | .............. C08K 5/00 |
| WO | WO 2017/018741 A1 | * | 2/2017 | .............. C08K 5/00 |
| WO | 2017/091040 A1 | | 6/2017 | |
| WO | WO 2017217738 A1 | * | 12/2017 | .............. C08L 27/06 |

\* cited by examiner

PLASTICIZER COMPOSITION AND RESIN COMPOSITION INCLUDING THE SAME

CROSS-REFERENCE TO RELATED APPLICATIONS

This application is the U.S. national stage of International Application No. PCT/KR2018/011976, filed Oct. 11, 2018, and claims the benefit of priority based on Korean Patent Application No. 10-2017-0133332, filed on Oct. 13, 2017, the entire contents of which are incorporated herein by reference.

TECHNICAL FIELD

The present invention relates to a plasticizer composition and a resin composition including the same.

BACKGROUND

Generally, plasticizers form corresponding esters by the reaction of alcohols with polycarboxylic acids such as phthalic acid and adipic acid. In addition, considering the internal and external regulations on harmful phthalate-based plasticizers to the human body, studies are continuing on plasticizer compositions which may replace phthalate-based plasticizers such as terephthalate-based, trimellitate-based and other polymer-based plasticizers.

Generally, plasticizers are used as raw materials of diverse products including wirings, pipes, flooring materials, wall papers, sheets, artificial leathers, tarpaulins, tapes and food wrapping materials. The diverse product is produced by processing methods including extrusion molding, injection molding and calendaring. The plasticizers are appropriately added in a resin such as polyvinyl chloride (PVC) with diverse additives such as a filler, a stabilizer, a pigment, and an anti-fogging agent in order to impart various processing properties to the diverse product.

Recently, in the plasticizer market situation, due to environmental issues on phthalate plasticizers, the development of eco-friendly plasticizers is competitively conducted in the art, and recently, the development of new products for overcoming the quality inferiority including the plasticization efficiency and migration properties of di(2-ethylhexyl) terephthalate (DEHTP) which is a widely used product among eco-friendly plasticizers, is being conducted.

Studies on technique for developing novel composition products including better products than the di(2-ethylhexyl) terephthalate to optimally apply as plasticizers for vinyl chloride-based resins, are required. Korean Laid-open Patent Nos. 10-2016-0095875 and 10-2016-0112443 disclose mixture plasticizers of di(2-ethylhexyl) terephthalate and citrate, as improved products, but the mixture plasticizers with the citrate have degraded thermal stability, and physical properties such as volatile loss and the density of a plasticizer product are still inferior.

Accordingly, studies on plasticizer materials which may have a mixture composition with di(2-ethylhexyl) terephthalate are continuously required, and in the market, improvement thereon is continuously required. However, clear solutions on widely used plasticizers which may satisfy the requirements of the present market are not suggested.

REFERENCE DOCUMENTS

Patent Document 1: KR 10-2016-0095875 A
Patent Document 2: KR 10-2016-0112443 A

SUMMARY

The present invention is devised to solve the defects of the conventional technique and provides a plasticizer composition which may secure physical properties such as plasticization efficiency, volatile loss, light resistance and thermal stability to excellent degrees if used as the plasticizer of a resin composition, and at the same time, may improve the density of a plasticizer product and improve the productivity of a final resin product, and a resin composition including the same.

To solve the tasks, there is provided in an embodiment of the present invention, a plasticizer composition including 70 to 99 wt % of a first plasticizer including a terephthalate-based material and a citrate-based material; and 1 to 30 wt % of a second plasticizer including an epoxidized alkyl ester composition containing one or more kinds of a compound represented by Formula 1 below, wherein the terephthalate-based material is one or more selected from the group consisting of di(2-ethylhexyl) terephthalate (DEHTP) and diisononyl terephthalate (DINTP), the citrate-based material is one or more selected from the group consisting of tributyl citrate (TBC) and tripentyl citrate (TPC), and a weight ratio of the terephthalate-based material and the citrate-based material is 90:10 to 60:40.

[Formula 1]

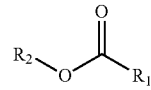

In Formula 1, $R_1$ is an alkyl group of 8 to 20 carbon atoms, containing one or more epoxy groups, and $R_2$ is an alkyl group of 4, 5, or 8 to 10 carbon atoms.

The plasticizer composition according to an embodiment of the present invention may secure physical properties such as plasticization efficiency, volatile loss, light resistance and thermal stability to excellent degrees, if used as the plasticizer of a resin composition, and at the same time, the plasticizer composition may decrease the portion thereof used in a product and thus, may improve the productivity of a final product.

DETAILED DESCRIPTION

Hereinafter, the present invention will be explained in detail to assist the understanding of the present invention. It will be understood that terms or words used in the present disclosure and claims should not be interpreted as having a meaning that is defined in common or in dictionaries, however should be interpreted in consistent with the technical scope of the present invention based on the principle that inventors may appropriately define the concept of the terms to explain the invention at his best method.

The term "composition" used in the description means a mixture of materials including a corresponding composition as well as a reaction product and a decomposition product produced from the materials of the corresponding composition.

The prefix "iso-" used in the description means an alkyl group in which a methyl group of 1 carbon atom is combined as a branched chain with the main chain of the alkyl group, and generally, means an alkyl group in which a methyl branch is combined at the terminal of the alkyl group, and in the description, may be used as a general term of an alkyl group in which a methyl group as a branched chain is bound to a main chain, unless otherwise separately designating alkyl group is present.

The term "isononyl group" used in the description may mean an alkyl group of total 9 carbon atoms, in which one or more among one or two methyl groups, one ethyl group and one propyl group are substituted as branched chains, and may be a term used as a general term of a 2-methyloctyl group, a 3-methyloctyl group, a 4-methyloctyl group, a 5-methyloctyl group, a 6-methyloctyl group, a 3-ethylheptyl group, a 2-ethylheptyl group, a 2,5-dimethylheptyl group, a 2,3-dimethylheptyl group, a 4,5-dimethylheptyl group, a 3-ethyl-4-methylhexyl group, a 2-ethyl-4-methylhexyl group, or a 2-propylhexyl group. A commercially used isononyl alcohol (CAS No.: 68526-84-1, 27458-94-2) may mean a composition of isomers having 1.2 to 1.9 branching degrees, and the commercial alcohol may partially include an n-nonyl group.

The term "pentyl group" used in the description has the meaning of an alkyl group of 5 carbon atoms, which commonly includes linear and branched alkyl groups, for example, an n-pentyl group, a 2-methylbutyl group, a 3-methylbutyl group, a 2,2-dimethylpropyl group, etc. as general terms, where the pentyl group may be used as a synonym for "amyl group" as a usual name.

According to an embodiment of the present invention, there is provided a plasticizer composition including 70 to 99 wt % of a first plasticizer including a terephthalate-based material and a citrate-based material; and 1 to 30 wt % of a second plasticizer including an epoxidized alkyl ester composition containing one or more kinds of a compound represented by Formula 1 below, wherein the terephthalate-based material is one or more selected from the group consisting of di(2-ethylhexyl) terephthalate (DEHTP) and diisononyl terephthalate (DINTP), the citrate-based material is one or more selected from the group consisting of tributyl citrate (TBC) and tripentyl citrate (TPC), and a weight ratio of the terephthalate-based material and the citrate-based material is 90:10 to 60:40.

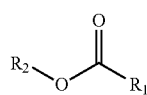

[Formula 1]

In Formula 1, $R_1$ is an alkyl group of 8 to 20 carbon atoms, containing one or more epoxy groups, and $R_2$ is an alkyl group of 4, 5, or 8 to 10 carbon atoms.

The plasticizer composition according to an embodiment of the present invention includes a first plasticizer and a second plasticizer and includes a terephthalate-based material and a citrate-based material as the first plasticizer. Generally, di(2-ethylhexyl) terephthalate or diisononyl terephthalate, which is applied as the terephthalate-based material, has inferior physical properties including plasticization efficiency and migration properties and, if used as a sole plasticizer, it is difficult to satisfy the quality according to the market demands. Thus, in order to improve the plasticization efficiency and migration properties, a citrate-based material is preferably used together, and particularly, tributyl citrate or tripentyl citrate may preferably be included.

Meanwhile, the mixing weight ratio of the terephthalate-based material and the citrate-based material is required to be controlled to 9:1 to 6:4. If the citrate-based material is included in an amount greater than 40 wt %, it is apprehended that volatile loss properties and migration loss properties may be markedly degraded, and mechanical properties such as elongation rate and tensile strength may be deteriorated.

In addition, if the citrate-based material is mixed in an amount less than 10 wt %, defects such as plasticization efficiency of the terephthalate-based material may not be solved, technical meaning of mixing the citrate-based material may be degraded, and the mechanical properties such as elongation rate may be rather degraded. To satisfy the above-mentioned effects, a more preferable range of 8:2 to 6:4 may be suggested.

In addition, the terephthalate-based material and the citrate-based material do require the use of a specific material. As described above, di(2-ethylhexyl) terephthalate or diisononyl terephthalate, which has 8 or 9 alkyl carbon atoms, is applied as the terephthalate-based material, and tributyl citrate or tripentyl citrate is applied as the citrate-based material. If other terephthalate or citrate is applied, without applying these materials, defects of unsatisfying optimized physical properties including volatile loss, migration loss, tensile strength and elongation rate as mechanical properties, and plasticization efficiency, may be generated, and the accomplishment of an object of the balance among important physical properties in productization may become difficult.

Meanwhile, the citrate-based material may have a structure represented by Formula 3 below.

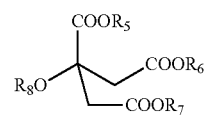

[Formula 3]

In Formula 3, $R_5$ to $R_7$ represent an n-butyl group, an isobutyl group, an n-pentyl group, a 2-methylbutyl group, a 3-methylbutyl group or a 2,2-dimethylpropyl group, and $R_8$ is hydrogen.

That is, $R_5$ to $R_7$ may be each independently an alkyl group of 4 or 5 carbon atoms, and may be selected from the above-described alkyl groups. In this case, the isobutyl group particularly means a 2-methylpropyl group, and "pentyl group" may be referred to as "amyl group" as a usual name.

In Formula 3, if an acetyl group is combined as $R_8$, and the acetyl group is present in the citrate, that is, if $R_8$ is an acetyl group, it is apprehended that the physical properties, particularly, the plasticization efficiency of the plasticizer may be degraded and thus, processability may be somewhat degraded and elongation rate may be significantly deteriorated. In addition, in preparing a citrate combined with the acetyl group, there may be a burden of increasing the costs for equipments for treating waste acetic acid which may be produced as by-products.

In other words, in the citrate-based material, if $R_8$ in Formula 3 is an acetyl group, when compared with hydrogen, issues of deteriorating plasticization efficiency, the injection of an increased amount of a plasticizer to overcome the deterioration and consequence increase of product costs may be accompanied. If a citrate-based material in which $R_8$ is an acetyl group is applied, consideration in diverse aspects including marketability, economic feasibility and physical properties is required.

Meanwhile, as a primary alcohol used as the raw material of a plasticizer, alcohols with smooth supply and demand conditions in the market including methanol, ethanol, butanol, amyl alcohol (pentanol, 5 carbon atoms), 2-ethylhexanol, isononanol, or 2-propylheptanol may be used, and among them, particularly, methanol, ethanol, butanol, pentanol, 2-ethylhexanol, isononanol and 2-propylheptanol are mainly distributed. Accordingly, the above-mentioned alcohols are mainly used as the alcohol used as the raw material of the reaction performed during preparing a plasticizer, and the evaluation of physical properties are generally performed on the basis of the alcohols.

In this regard, as the first plasticizer of the plasticizer composition according to the present invention, terephthalate derived from 2-ethylhexanol or isononanol and citrate derived from butanol or pentanol are a combination showing the best physical properties considering physical properties or the supply and demand in the market.

The plasticizer composition according to an embodiment of the present invention includes a first plasticizer and a second plasticizer, and is characterized in including the first plasticizer together with an epoxidized alkyl ester composition as the second plasticizer.

The epoxidized alkyl ester composition may include one or more kinds of an epoxidized fatty acid alkyl ester (eFAAE), particularly, one or more kinds of the compound represented by Formula 1.

$R_2$ in Formula 1 is an alkyl group of 4, 5 or 8 to 10 carbon atoms, particularly, a butyl group, a pentyl group, a 2-ethylhexyl group, an isononyl group, a nonyl group, an isodecyl group or a 2-propylheptyl group, preferably, a butyl group, a pentyl group, a 2-ethylhexyl group, an isononyl group or a 2-propylheptyl group.

If $R_2$ in Formula 1 is an alkyl group of 4, 5 or 8 to 10 carbon atoms, that is, a butyl group, a 2-ethylhexyl group, an isononyl group, or a 2-propylheptyl group, migration properties, plasticization efficiency and mechanical properties may be uniformly excellent, and the deteriorating phenomenon of one specific property may be eliminated.

If the epoxidized fatty acid alkyl ester is, for example, a material such as epoxidized fatty acid methyl ester and epoxidized fatty acid ethyl ester, plasticization efficiency may be improved but volatile loss may be deteriorated, and a large amount of volatile materials may be produced during processing.

Further, if the epoxidized alkyl ester composition is used as the second plasticizer, particularly, heat resistance and light resistance may be excellent, and thus, though a final resin product is exposed to ultraviolet rays for a long time, the product may not be deformed, and the composition may be particularly applicable to a product to be exposed to light for a long time.

Accordingly, the alkyl of the epoxidized alkyl ester composition, which may show the most excellent physical properties as a combination with the first plasticizer, may use a butyl group, a pentyl group, a 2-ethylhexyl group, an isononyl group or a 2-propylheptyl group, and particularly preferably, a butyl group, a pentyl group or a 2-ethylhexyl group may be used.

In addition, the epoxidized alkyl ester composition represented by Formula 1 includes two or more compounds, and a composition in which two or more compounds having different carbon number in $R_1$ or different epoxy group number are mixed may be formed.

Meanwhile, the epoxidized alkyl ester composition may have the oxirane content (O.C.) of 3.5% or more, 4.0% or more, or 4.2% or more, preferably, 4.5% or more. In addition, the epoxidized alkyl ester composition may have an iodine value of less than 3.5 $I_2$ g/100 g (hereinafter, the unit "$I_2$ g/100 g" will be omitted), preferably, 3.2 or less, more preferably, 3.0 or less.

The iodine value and oxirane content measured of the epoxidized alkyl ester composition may be important factors in case of being applied to a plasticizer composition. Particularly, recently, eco-friendly properties are essentially required, and the iodine value and the oxirane content may significantly influence plasticizer properties.

If the iodine value is 3.5 or more, defects of generating the discoloration of a resin product or increasing turbidity may occur, but if the iodine value is less than 3.5, mechanical properties such as tensile strength and elongation rate may be improved.

Accordingly, the iodine value of the epoxidized alkyl ester composition may preferably be less than 3.3, more preferably, 3.2 or less, even more preferably, 3.0 or less. The iodine value represents the amount of double bonds present in a molecule and may be obtained from a value measured by a titration method through the iodination of the double bond.

In addition, the oxirane content may be changed according to the number of epoxy group included in the substituent represented by $R_1$ in Formula 1. The oxirane content may be 3.5% or more, 4.0% or more, or 4.2% or more, preferably, 4.5% or more. The oxirane content may be measured by a titration method, and may be measured by a titration method using a specimen and an acid solution.

The iodine value may represent the amount of a double bond, and the amount of a double bond may be the amount of a double bond remaining after performing epoxidation reaction such as the epoxidation of a vegetable oil and the epoxidation of a fatty acid alkyl ester. That is, the oxirane content and the iodine value may be indexes on the degree of epoxidation, and may be related to some extent with each other. Theoretically, they are in inverse proportion to each other.

However, substantially, the double bond of the vegetable oil or fatty acid alky ester may be diverse in every material, and the two parameters are not accurately in inverse proportion or forms trade off relation. A material having higher iodine value among two materials may have the higher oxirane content at the same time. Accordingly, to a plasticizer composition used in a product requiring eco-friendliness, an epoxidized fatty acid 2-ethylhexyl ester compound having an iodine value and the oxirane content, satisfying the above-mentioned ranges may preferably be applied.

Meanwhile, the oxirane index (O.I.) of the epoxidized alkyl ester composition may be 1.0 or more.

As described above, the iodine value and the oxirane content have the relation as described above, but at the same time, the oxirane index may preferably satisfy 1.0 or more, preferably, 1.5 or more, optimally, 2.0 or more. The "oxirane index" is the ratio of the oxirane content with respect to the iodine value of the epoxidized fatty acid alkyl ester compound, and may be the ratio of epoxidized double bonds with respect to unreacted remaining double bonds after epoxidation reaction.

Particularly, the oxirane index may be the ratio of the oxirane content with respect to the iodine value and may be 1.0 or more. That is, if a value obtained by dividing the oxirane content of the epoxidized fatty acid alkyl ester by the iodine value is 1.0 or more, a more optimized plasticizer composition may be obtained.

The epoxidized alkyl ester composition includes an epoxidized alkyl ester composition including one or more kinds of the compound represented by Formula 1, and may additionally include a saturated fatty acid alkyl ester composition including one or more kinds of the compound represented by Formula 2 below.

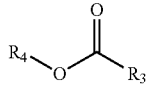

[Formula 2]

In Formula 2, $R_3$ is an alkyl group of 8 to 20 carbon atoms, and $R_4$ is an alkyl group of 4, 5 or 8 to 10 carbon atoms.

In the saturated fatty acid alkyl ester composition including one or more kinds of the compound represented by Formula 2, $R_3$ may not include an epoxy group, the fatty acid moiety of an epoxidized oil may be diverse during preparing an epoxidized fatty acid alkyl ester using an epoxidized oil and an alcohol, and a fatty acid moiety not combined with an epoxy group may be present among them. The compound represented by Formula 2 may be a compound derived from such a fatty acid moiety.

If such a saturated fatty acid alkyl ester is included in an epoxidized alkyl ester composition and included in a plasticizer composition, the saturated fatty acid alkyl ester has 8 to 18 carbon atoms as small carbon number does not include an oxirane group to be able to assist plasticization efficiency and migration properties. Accordingly, a separation process is not required, and the cost management of a product may be favorable.

However, if the saturated fatty acid alkyl ester composition is about 80 wt % or more in a total second plasticizer including an epoxidized alkyl ester composition, the compatibility with a vinyl chloride resin may be deteriorated. If the amount is 70 wt % or less, preferably, 50 wt % or less, most preferably, 30 wt % or less, the compatibility with the resin may be good.

The plasticizer composition according to an embodiment of the present invention is also required to control the weight ratio of the first plasticizer and the second plasticizer, and the weight ratio may be 99:1 to 70:30, more preferably, as the upper limit, 95:5, 90:10, 85:15 or 80:20.

If the plasticizer composition is formed by mixing the first plasticizer and the second plasticizer within the range, the limitation of a terephthalate-based material and a citrate-based material, heat resistance and/or light resistance, may be solved, defects on the migration properties or loss properties of an epoxidized fatty acid alkyl ester composition may be compensated, and at the same time, synergistic effects of improving mechanical properties may be achieved.

Particularly, if the epoxidized alkyl ester composition is mixed with the citrate-based material such as tripentyl citrate or tributyl citrate, the properties thereof may be optimally shown, and balance among physical properties may be quite excellent. Accordingly, the composition may be considerably widely applied from a resin for a food wrapping material to the sheet of cars.

The plasticizer composition according to an embodiment of the present invention may be prepared by blending a first plasticizer and a second plasticizer, and the first plasticizer may be also prepared by blending a terephthalate-based material and a citrate-based material.

In addition, an epoxidized alkyl ester composition as the second plasticizer may be prepared from natural vegetable oil such as soybean oil, linseed oil, and castor oil, and may be prepared by "epoxidizing" the natural oil and "esterifying" using a primary alcohol having 4, 5 or 8 to 10 alkyl carbon atoms. The order of epoxidation reaction and esterification reaction is not limited but the conditions of the preparation method are required to be controlled to satisfy the above-mentioned iodine value and oxirane index.

According to another embodiment of the present invention, a resin composition including 100 parts by weight of a resin; and 5 to 100 parts by weight of the plasticizer composition is provided.

The resin may use ethylene vinyl acetate, polyethylene, polyketone, polypropylene, polyvinyl chloride, polystyrene, polyurethane, thermoplastic elastomer or a mixture thereof, preferably, polyvinyl chloride.

For example, the polyvinyl chloride, i.e., a vinyl chloride resin may be classified into a paste vinyl chloride resin and a straight vinyl chloride resin according to the use and processing method thereof. The paste vinyl chloride resin is a resin applied to a product such as flooring materials, wall papers, and films, and is generally prepared by plastisol processing. The amount of the plasticizer may be about 40 to 150 parts by weight, 60 to 130 parts by weight, preferably, 80 to 120 parts by weight.

Differently, the straight vinyl chloride resin is a resin applied to a product such as wirings and interior materials, and may be prepared, if a melting process is performed in general, by a processing method such as extrusion molding, injection molding and calendaring molding. In this case, the amount of the plasticizer may be about 5 to 60 parts by weight, preferably, 10 to 50 parts by weight.

The plasticizer composition according to an embodiment of the present invention may be applied to both the paste vinyl chloride resin and the straight vinyl chloride resin, but may preferably be appropriate to the straight vinyl chloride resin which may undergo a melting process, considering the maximization of the physical properties of the plasticizer. Viscosity properties are important physical properties for the paste vinyl chloride resin, but physical properties such as plasticization efficiency and migration properties are important for the straight vinyl chloride resin. The plasticizer composition according to the present invention may be more appropriate for the straight vinyl chloride resin because the product thereof has improved physical properties such as plasticization efficiency, migration properties, volatile loss and light resistance.

In addition, since most products requiring heat resistance are products undergoing a melting process, the plasticizer composition according to the present invention may appropriately be used in the straight vinyl chloride resin.

Further, in the resin composition, diverse kinds of additives may be injected to a resin used together with a product to be processed, and an auxiliary agent of physical properties or an auxiliary agent for processing such as a filler, a thermal stabilizer, an auxiliary stabilizer and a foaming agent, may be injected. The amount thereof may be appropriately selected in a widely known range in the art.

EXAMPLES

Hereinafter, embodiments will be explained in detail to particularly explain the present invention. The present invention may, however, be embodied in different forms and should not be construed as limited to the embodiments set forth herein. Rather, these embodiments are provided so that this disclosure will be thorough and complete, and will fully convey the scope of the inventive concept to those skilled in the art.

1. Preparation of Plasticizer

Preparation Example 1: Preparation of di(2-ethylhexyl) terephthalate (DEHTP)

To a four-neck, 3 liter reactor equipped with a cooler, a condenser, a decanter, a reflux pump, a temperature controller, a stirrer, etc., 498.0 g of purified terephthalic acid (TPA), 1,170 g of 2-ethylhexyl alcohol (2-EH) (molar ratio of TPA:2-EH was (1.0):(3.0)), and 1.54 g of tetraisopropyl titanate (TIPT) as a titanium-based catalyst (0.31 parts by weight on the basis of 100 parts by weight of TPA) were injected, followed by slowly elevating the temperature to about 170° C. The generation of water began at about 170° C. Esterification reaction was conducted at the reaction temperature of about 220° C. under the atmospheric pressure while continuously injecting a nitrogen gas for about 4.5 hours, and the reaction was terminated when an acid value reached 0.01.

After finishing the reaction, distillation-extraction under a reduced pressure was conducted for 0.5 to 4 hours to remove unreacted raw materials. To remove the unreacted raw materials to a certain amount degree or less, steam extraction was conducted using steam under a reduced pressure for 0.5 to 3 hours. The temperature of the reactant was lowered to about 90° C., and neutralization treatment was conducted using an alkaline solution. In addition, washing may be conducted, followed by dehydrating the reactant to remove water. A filter medium was injected to the dehydrated reactant, followed by stirring for a certain time and filtering to finally obtain 1,161 g of di-(2-ethylhexyl) terephthalate (DEHTP) (yield 99.0%).

Preparation Example 2: Preparation of Diisononyl Terephthalate (DINTP)

The same procedure described in Preparation Example 1 was performed except for using 1,300 g of isononyl alcohol (Oxocol 900, KH NeoChem) instead of 2-ethylhexyl alcohol to finally obtain 1,244 g of diisononyl terephthalate (DINTP) (yield: 99.0%).

Preparation Example 3: Preparation of Tributyl Citrate (TBC)

By using 384 g of citric acid and 580 g of butanol as reaction raw materials, 706 g of tributyl citrate was finally obtained (yield 98%).

Preparation Example 4: Preparation of tri(n-pentyl) citrate (TnPC)

By using 384 g of citric acid and 686 g of n-pentanol as reaction raw materials, 706 g of tri(n-pentyl) citrate was finally obtained (yield 98%).

Preparation Example 5: Preparation of eFAEHA

To a four-neck, 3 liter reactor equipped with a cooler, a condenser, a decanter, a reflux pump, a temperature controller, a stirrer, etc., 1,000 g of epoxidized soybean oil (ESO) of which oxirane content was 6.97% and iodine value was 1.93 ($I_2$/100 g), 500 g of 2-ethylhexyl alcohol (2-EH), and 5.5 g of a metal salt catalyst were injected, followed by slowly elevating the temperature to about 180° C.

Through gas chromatography analysis, the complete reaction and consumption of the raw material, EOS, was secured, and the reaction was finished. After finishing the reaction, a step of removing glycerin as by-products, a step of removing unreacted raw materials, and a step of purifying a product were performed to finally obtain 1,210 g of epoxidized 2-ethylhexyl ester composition having the oxirane content of 5.21% and iodine value of 1.70.

Preparation Example 6: Preparation of eFAINE

The same procedure described in Preparation Example 5 was performed except for using isononyl alcohol (Oxocol 900, KH NeoChem) instead of 2-ethylhexanol to obtain an epoxidized isononyl ester composition having the oxirane content of 5.22% and iodine value of 1.71.

Preparation Example 7: Preparation of eFABE

The same procedure described in Preparation Example 5 was performed except for using butanol instead of 2-ethylhexanol to obtain an epoxidized butyl ester composition having the oxirane content of 5.18% and iodine value of 1.68.

Preparation Example 8: Preparation of eFnPAE

The same procedure described in Preparation Example 5 was performed except for using n-pentanol instead of 2-ethylhexanol to obtain an epoxidized n-pentyl ester composition having the oxirane content of 5.20% and iodine value of 1.73.

Preparation Example 9: Preparation of eFAPHE

The same procedure described in Preparation Example 5 was performed except for using 2-propylheptanol instead of 2-ethylhexanol to obtain an epoxidized 2-propylheptyl ester composition having the oxirane content of 5.10% and iodine value of 1.68.

Comparative Preparation Example 1: Preparation of eFAME

The same procedure described in Preparation Example 1 was performed except for using methanol instead of 2-ethylhexanol to obtain an epoxidized methyl ester composition having the oxirane content of 5.13% and iodine value of 1.80.

Comparative Preparation Example 2: Preparation of tri(2-ethylhexyl) citrate (TEHC)

By using 384 g of citric acid and 1,014 g of 2-ethylhexanol as reaction raw materials, 1,029 g of tri(2-ethylhexyl) citrate was finally obtained (yield 98%).

2. Evaluation Items and Measurement Methods of Physical Properties of Plasticizer 1) Hardness Shore (Shore D) hardness at 25° C., 3 T 10 s was measured using a durometer (Mitutoyo) according to ASTM D2240.

2) Tensile Strength

By ASTM D638 method, a specimen was drawn in a cross head speed of 200 mm/min (1 T) using a test apparatus of U.T.M (manufacturer: Instron, model name: 4466), and a point where the specimen was cut was measured. The tensile strength was calculated as follows.

Tensile strength(kgf/cm$^2$)=load value (kgf)/thickness (cm)×width(cm)

3) Elongation Rate

By ASTM D638 method, a specimen was drawn in a cross head speed of 200 mm/min using a test apparatus of U.T.M (manufacturer: Instron, model name: 4466), and a point where the specimen was cut was measured. The elongation rate was calculated as follows.

Elongation rate(%)=length after elongation/initial length×100

4) Migration Loss

According to KSM-3156, a specimen with a thickness of 2 mm or more was obtained, PS plated were attached onto both sides of the specimen and a load of 1 kgf/cm$^2$ was applied. The specimen was stood in a hot air circulation type oven (JISICO(KR) Co. gear oven) at 80° C. for 72 hours and then taken out and cooled at room temperature for 4 hours. Then, the PS plates attached onto both sides of the specimen were removed, the weights before and after standing in the oven were measured, and the migration loss was calculated as follows.

Migration loss(%)={(initial weight of specimen at room temperature−weight of specimen after standing in oven)/initial weight of specimen at room temperature}×100

5) Volatile Loss

The specimen manufactured for evaluating the migration loss was processed under the same conditions as in the evaluation of the migration loss, at 80° C. for 72 hours, and the weight of the specimen was measured.

Volatile loss(wt %)={(initial weight of specimen−weight of specimen after processing at 80° C. for 72 hours)/initial weight of specimen}×100

6) Measurement of Light Resistance

By ASTM 4329-13 method, a specimen was stood on QUV (QUV/se, Q-LAB) and exposed to UV (340 nm) for a certain time. Then, the color change was calculated using a reflectometer (Tintometer, LoviBond).

7) Measurement of Heat Resistance

A specimen manufactured was processed in a convention oven (JEIO Tech) at 80° C. for a certain time, and the color change degree before and after processing was measured. The measurement value was determined by the changed value of an E value with respect to L, a, and b values using a colorimeter (Tintometer, LoviBond).

3. Evaluation of Physical Properties of Plasticizer

1) Configuration of Examples and Comparative Examples

By using the materials prepared in the Preparation Examples, Examples and Comparative Examples were configured as in Table 1 below.

TABLE 1

|  | First plasticizer |  | Weight ratio among first plasticizers | Second plasticizer | Weight ratio of first:second |
| --- | --- | --- | --- | --- | --- |
| Example 1 | DEHTP | TBC | 7:3 | eFAEHE | 90:10 |
| Example 2 | DEHTP | TBC | 7:3 | eFAEHE | 80:20 |
| Example 3 | DEHTP | TBC | 7:3 | eFABE | 90:10 |
| Example 4 | DEHTP | TPC | 7:3 | eFAEHE | 80:20 |

TABLE 1-continued

|  | First plasticizer |  | Weight ratio among first plasticizers | Second plasticizer | Weight ratio of first:second |
| --- | --- | --- | --- | --- | --- |
| Example 5 | DEHTP | TPC | 8:2 | eFAINE | 90:10 |
| Example 6 | DEHTP | TBC | 9:1 | eFAPE | 80:20 |
| Example 7 | DEHTP | TBC | 8:2 | eFAEHE | 70:30 |
| Example 8 | DEHTP | TPC | 6:4 | eFAEHE | 95:5 |
| Example 9 | DINTP | TBC | 6:4 | eFABE | 95:5 |
| Example 10 | DINTP | TBC | 8:2 | eFAPE | 80:20 |
| Example 11 | DINTP | TPC | 7:3 | eFAPHE | 90:10 |
| Example 12 | DINTP | TPC | 9:1 | eFABE | 70:30 |
| Comparative Example 1 | DEHTP | TBC | 7:3 | X | — |
| Comparative Example 2 | DEHTP | TBC | 7:3 | ESO | 90:10 |
| Comparative Example 3 | DEHTP | TBC | 7:3 | eFAME | 70:30 |
| Comparative Example 4 | DBTP | TBC | 7:3 | eFAEHE | 90:10 |
| Comparative Example 5 | DEHTP | ATBC | 7:3 | eFAEHE | 90:10 |
| Comparative Example 6 | DEHTP | X | — | eFAEHE | 80:20 |
| Comparative Example 7 | X | TBC | — | eFAEHE | 80:20 |
| Comparative Example 8 | X | X | — | eFAEHE | — |
| Comparative Example 9 | DEHTP | TBC | 7:3 | eFAEHE | 50:50 |
| Comparative Example 10 | DEHTP | TBC | 50:50 | eFAEHE | 90:10 |
| Comparative Example 11 | DEHTP | TBC | 50:50 | eFAEHE | 50:50 |
| Comparative Example 12 | DEHTP | TBC | 95:5 | eFAEHE | 90:10 |
| Comparative Example 13 | DIDTP | TBC | 7:3 | eFAEHE | 90:10 |
| Comparative Example 14 | DEHTP | TEHC | 7:3 | eFAPHE | 90:10 |

All materials not shown in the Preparation Examples and the Comparative Preparation Examples were materials purchased from LG Chem.

2) Experimental Example 1: Evaluation of Basic Physical Properties

The plasticizers of the Examples and the Comparative Examples were used as specimens for experiment. Each specimen was manufactured referring to ASTM D638. 100 parts by weight of PVC (LS100S, LG Chem,), 30 parts by weight of a plasticizer and 3 parts by weight of a stabilizer (LOX 912 NP) were blended using a mixer and roll milled at 170° C. for 4 minutes. By processing using a press at 180° C. for 2.5 minutes (low pressure) and 2 minutes (high pressure), 1 T and 3 T sheets were manufactured. Using each specimen, the tests on physical properties were conducted and the results are listed in Table 2 below.

TABLE 2

|  | Hardness (Shore D) | Tensile strength kgf/cm$^2$ | Elongation rate (%) | Migration loss (%) | Volatile loss (%) |
| --- | --- | --- | --- | --- | --- |
| Example 1 | 57.8 | 253.3 | 288.8 | 1.74 | 1.32 |
| Example 2 | 57.6 | 251.7 | 284.0 | 1.78 | 1.25 |
| Example 3 | 57.5 | 256.4 | 286.6 | 1.82 | 1.43 |
| Example 4 | 57.7 | 268.7 | 295.8 | 1.41 | 0.86 |
| Example 5 | 57.7 | 270.6 | 299.7 | 1.45 | 0.82 |
| Example 6 | 57.5 | 262.3 | 290.3 | 1.70 | 1.20 |
| Example 7 | 57.5 | 265.1 | 298.6 | 1.50 | 0.92 |
| Example 8 | 57.0 | 264.8 | 293.5 | 1.24 | 1.38 |

TABLE 2-continued

|  | Hardness (Shore D) | Tensile strength kgf/cm² | Elongation rate (%) | Migration loss (%) | Volatile loss (%) |
|---|---|---|---|---|---|
| Example 9 | 57.3 | 269.7 | 300.8 | 1.53 | 0.63 |
| Example 10 | 57.5 | 271.1 | 301.2 | 1.56 | 0.78 |
| Example 11 | 57.7 | 280.2 | 298.0 | 1.40 | 0.60 |
| Example 12 | 57.7 | 280.3 | 297.6 | 1.75 | 1.20 |
| Comparative Example 1 | 58.4 | 256.9 | 280.7 | 1.79 | 1.40 |
| Comparative Example 2 | 58.7 | 258.0 | 289.4 | 1.71 | 1.32 |
| Comparative Example 3 | 55.8 | 242.1 | 258.5 | 3.35 | 3.48 |
| Comparative Example 4 | 55.3 | 230.4 | 241.0 | 3.56 | 6.33 |
| Comparative Example 5 | 58.3 | 254.7 | 265.4 | 1.90 | 1.20 |
| Comparative Example 6 | 61.2 | 268.8 | 284.7 | 3.11 | 0.64 |
| Comparative Example 7 | 52.2 | 221.0 | 212.3 | 2.04 | 16.70 |
| Comparative Example 8 | 54.3 | 234.5 | 256.1 | 7.45 | 3.66 |
| Comparative Example 9 | 57.4 | 241.0 | 263.2 | 3.50 | 2.01 |
| Comparative Example 10 | 54.8 | 247.8 | 270.6 | 1.96 | 4.20 |
| Comparative Example 11 | 54.2 | 240.5 | 258.1 | 3.21 | 4.81 |
| Comparative Example 12 | 56.0 | 267.3 | 274.3 | 2.43 | 0.96 |
| Comparative Example 13 | 60.4 | 264.5 | 245.7 | 2.48 | 0.52 |
| Comparative Example 14 | 59.4 | 268.7 | 254.3 | 2.03 | 0.68 |

Referring to Table 2, though the first plasticizer of DEHTP and TBC and the second plasticizer of an epoxidized alkyl ester were mixed, the degradation of physical properties according to the decrease of the amount of the first plasticizer was not found, and rather volatile loss properties were improved and plasticization efficiency was improved considering the decrease of hardness.

Particularly, referring to Comparative Example 1 in which only the first plasticizer was included, the plasticization efficiency was found to be worse than that of the Examples, and the mechanical properties were found to be equivalent or worse. In addition, referring to Comparative Example 2 in which not an epoxidized alkyl ester but ESO epoxidized oil was used as the second plasticizer, it was found that the results were not much different when compared with Comparative Example 1, and effects attained by the addition of the second plasticizer were little. In addition, Comparative Example 8, in which only the second plasticizer was used, was found to have a significant problem on mechanical properties and markedly inferior migration loss and volatile loss. In addition, Comparative Example 5, in which a citrate-based material combined with an acetyl group was applied as the first plasticizer, showed significant decrease on elongation rate and migration loss when compared with Example 1 of which conditions were the same except for the acetyl group.

Also, referring to Comparative Example 3 (the alkyl carbon atom number of epoxidized alkyl ester was 1) and Comparative Example 4 (the carbon number of terephthalate-based material), in which the carbon number was inappropriately selected in the above-mentioned three materials, mechanical properties were inferior, and particularly, elongation rate was degraded, and migration loss and volatile loss were too significantly increased to use as a product.

Meanwhile, Comparative Example 6 which did not include a citrate-based material was found to have markedly weak plasticization efficiency (hardness increase) and bad migration properties. In Comparative Example 7 in which a terephthalate-based material was not applied, all physical properties were found inferior.

Referring to Comparative Examples 10 and 12, in which a ratio in the first plasticizer was not controlled well, it was found that elongation rate was significantly degraded, and migration loss and volatile loss were rapidly deteriorated. In addition, in Comparative Example 9 in which the ratio of the first plasticizer and the second plasticizer was not controlled well, all physical properties were found not good. As in other Comparative Examples, Comparative Example 11 in which all ratios were not controlled, was also found to show decreased mechanical properties, together with migration loss and volatile loss when compared with those of the Examples.

In addition, in Comparative Example 13 in which the carbon number of a terephthalate-based material was unfulfilled and Comparative Example 14 in which the carbon number of a citrate-based material was unfulfilled, it was found that plasticization efficiency was inferior, tensile strength and elongation rate as mechanical properties were hard to see excellent, and migration loss was considerable.

3) Experimental Example 2; Evaluation of Heat Resistance

The plasticizers of the Examples and the Comparative Examples were used as specimens for experiments. Each specimen was manufactured referring to ASTM D638. 100 parts by weight of PVC (LS100S, LG Chem), 30 parts by weight of a plasticizer, 3 parts by weight of a stabilizer (LOX 912 NP), and 1.5 parts by weight of $TiO_2$ were blended using a mixer and roll milled at 170° C. for 4 minutes. By processing using a press at 180° C. for 2.5 minutes (low pressure) and 2 minutes (high pressure), 1 T and 3 T sheets were manufactured. Using each specimen, the tests on heat resistance were conducted at 80° C. for 1 week, 2 weeks, 3 weeks and 4 weeks, and the results are listed in Table 3 below.

TABLE 3

|  | 1 week | 2 weeks | 3 weeks | 4 weeks |
|---|---|---|---|---|
| Example 1 | 3.86 | 6.98 | 10.14 | 12.96 |
| Example 2 | 3.19 | 6.10 | 8.99 | 11.70 |
| Example 3 | 3.64 | 6.72 | 9.81 | 12.65 |
| Example 4 | 3.05 | 6.01 | 8.56 | 10.88 |
| Example 5 | 3.30 | 6.75 | 9.24 | 11.98 |
| Example 6 | 3.35 | 6.15 | 9.04 | 12.50 |
| Example 7 | 3.00 | 6.35 | 8.50 | 11.31 |
| Example 8 | 3.10 | 5.64 | 8.02 | 9.65 |
| Example 9 | 3.25 | 5.88 | 8.24 | 9.98 |
| Example 10 | 3.45 | 6.41 | 8.60 | 10.67 |
| Example 11 | 3.47 | 6.11 | 8.37 | 10.54 |
| Example 12 | 2.86 | 5.80 | 7.98 | 9.50 |
| Comparative Example 1 | 4.93 | 8.67 | 12.50 | 16.10 |
| Comparative Example 2 | 4.61 | 7.80 | 10.75 | 13.41 |
| Comparative Example 6 | 4.88 | 7.23 | 11.20 | 12.90 |

Referring to Table 3, it was found that Examples 1 to 12 showed better thermal stability in all term evaluations than Comparative Examples 1, 2 and 6. Particularly, referring to Comparative Examples 1 and 2, it was found that thermal stability was improved by injecting a second plasticizer, and as shown in Experimental Example 1, physical properties were improved and at the same time, thermal stability was improved.

4) Experimental Example 3: Evaluation of Light Resistance

The plasticizers of the Examples and the Comparative Examples were used as specimens for experiments. Each specimen was manufactured referring to ASTM D638. 100 parts by weight of PVC (LS100S, LG Chem), 30 parts by weight of a plasticizer, and 3 parts by weight of a stabilizer (LOX 912 NP) were blended using a mixer and roll milled at 170° C. for 4 minutes. By processing using a press at 180° C. for 2.5 minutes (low pressure) and 2 minutes (high pressure), 1 T and 3 T sheets were manufactured. Using each specimen, the tests on heat resistance were conducted for 200 hours, 300 hours, 400 hours, 500 hours, 600 hours and 700 hours, and the results are listed in Table 4 below.

TABLE 4

| | 200 hr | 300 hr | 400 hr | 500 hr | 600 hr | 700 hr |
|---|---|---|---|---|---|---|
| Example 1 | 0.67 | 4.53 | 10.28 | 21.91 | 27.14 | 37.79 |
| Example 2 | 1.42 | 2.59 | 7.33 | 17.08 | 23.75 | 34.23 |
| Example 3 | 0.70 | 7.67 | 15.25 | 22.22 | 33.49 | 38.76 |
| Example 4 | 0.89 | 3.45 | 9.68 | 18.74 | 25.64 | 36.20 |
| Example 5 | 1.40 | 4.20 | 11.10 | 20.13 | 25.41 | 36.77 |
| Example 6 | 1.56 | 3.80 | 10.02 | 17.63 | 24.50 | 36.10 |
| Example 7 | 0.87 | 2.66 | 9.40 | 15.30 | 22.54 | 33.20 |
| Example 8 | 1.34 | 5.65 | 12.01 | 20.87 | 28.98 | 40.50 |
| Example 9 | 1.55 | 5.60 | 11.24 | 22.30 | 29.14 | 39.44 |
| Example 10 | 1.02 | 2.40 | 7.85 | 16.50 | 21.32 | 33.11 |
| Example 11 | 1.14 | 3.86 | 9.20 | 20.31 | 25.74 | 38.01 |
| Example 12 | 0.90 | 2.87 | 8.65 | 14.35 | 21.30 | 32.20 |
| Comparative Example 1 | 5.80 | 14.44 | 23.33 | 32.59 | 39.66 | 47.28 |
| Comparative Example 2 | 1.68 | 9.37 | 16.23 | 26.50 | 37.01 | 49.68 |
| Comparative Example 6 | 3.41 | 12.32 | 20.31 | 29.68 | 36.85 | 46.50 |

Referring to Table 4, it was found that Examples 1 to showed markedly improved light stability when compared with Comparative Examples 1, 2 and 6.

That is, considering all evaluation results on basic physical properties, heat resistance and light resistance, in case where a terephthalate-based material (particularly, DEHTP or DINTP) and a citrate-based material (particularly, TBC or TPC) were applied as the first plasticizer and an epoxidized alkyl ester of 4, 5 or 8 to 10 carbon atoms was applied as the second plasticizer, as in the present invention was found to show improved heat resistance and light resistance without making a loss in the basic physical properties according to the decrease of the amount of the first plasticizer.

Although the preferred embodiments of the present invention have been described in detail, it is understood that the present invention should not be limited to these embodiments but various changes and modifications can be made by one ordinary skilled in the art within the spirit and scope of the present invention as hereinafter claimed.

The invention claimed is:

1. A plasticizer composition, comprising:
   70 to 99 wt % of a first plasticizer comprising a terephthalate-based material and a citrate-based material; and
   1 to 30 wt % of a second plasticizer comprising an epoxidized alkyl ester composition containing one or more compounds represented by Formula 1:

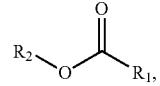

[Formula 1]

wherein in Formula 1, $R_1$ is an alkyl group of 8 to 20 carbon atoms containing one or more epoxy substituents, and $R_2$ is selected from the group consisting of an isononyl group and a 2-propylheptyl group,
   wherein the terephthalate-based material is one or more selected from the group consisting of di(2-ethylhexyl) terephthalate (DEHTP) and diisononyl terephthalate (DINTP),
   wherein the citrate-based material is one or more selected from the group consisting of tributyl citrate (TBC) and tripentyl citrate (TPC),
   wherein a weight ratio of the first plasticizer and the second plasticizer is 95:5 to 70:30, and
   wherein a weight ratio of the terephthalate-based material and the citrate-based material in the first plasticizer is 90:10 to 60:40.

2. The plasticizer composition of claim 1, wherein the epoxidized alkyl ester composition has an iodine value of less than 3.5 $I_2$g/100 g.

3. The plasticizer composition of claim 1, wherein the epoxidized alkyl ester composition has an oxirane content (O.C.) of 3.5% or more.

4. The plasticizer composition of claim 1, wherein the epoxidized alkyl ester composition has an oxirane index (O.I.) of 1.0 or more.

5. The plasticizer composition of claim 1, wherein the weight ratio of the terephthalate-based material and the citrate-based material is 80:20 to 60:40.

6. The plasticizer composition of claim 1, wherein the epoxidized alkyl ester composition further comprises a compound represented by Formula 2 below:

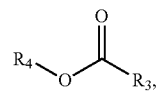

[Formula 2]

wherein in Formula 2, $R_3$ is an alkyl group of 8 to 20 carbon atoms with the proviso that $R_3$ is not an epoxy group, and $R_4$ is an alkyl group of 4, 5, or 8 to 10 carbon atoms.

7. A resin composition comprising 100 parts by weight of a resin; and 5 to 150 parts by weight of the plasticizer composition of claim 1.

8. The resin composition of claim 7, wherein the resin is one or more selected from the group consisting of ethylene vinyl acetate, polyethylene, polypropylene, polyketone, polyvinyl chloride, polystyrene, polyurethane and thermoplastic elastomer.

* * * * *